United States Patent
Ibatullin et al.

(10) Patent No.: US 9,565,208 B2
(45) Date of Patent: Feb. 7, 2017

(54) SYSTEM AND METHOD FOR DETECTING NETWORK INTRUSIONS USING LAYERED HOST SCORING

(71) Applicant: VECTRA NETWORKS, INC., San Jose, CA (US)

(72) Inventors: Oskar Ibatullin, San Jose, CA (US); Ryan James Prenger, Oakland, CA (US); Nicolas Beauchesne, Miami Beach, FL (US); Karl Matthew Lynn, Winter Garden, FL (US); Oliver Kourosh Tavakoli, Monte Sereno, CA (US)

(73) Assignee: Vectra Networks, Inc., San Jose, CA (US)

( * ) Notice: Subject to any disclaimer, the term of this patent is extended or adjusted under 35 U.S.C. 154(b) by 0 days.

(21) Appl. No.: 14/644,166

(22) Filed: Mar. 10, 2015

(65) Prior Publication Data
US 2015/0264061 A1 Sep. 17, 2015

Related U.S. Application Data

(60) Provisional application No. 61/951,102, filed on Mar. 11, 2014.

(51) Int. Cl.
*G06F 12/14* (2006.01)
*H04L 29/06* (2006.01)

(52) U.S. Cl.
CPC ......... *H04L 63/145* (2013.01); *H04L 63/1433* (2013.01); *H04L 2463/121* (2013.01)

(58) Field of Classification Search
None
See application file for complete search history.

(56) References Cited

U.S. PATENT DOCUMENTS 6,952,779 B1   10/2005   Cohen et al.
8,140,539 B1 *  3/2012   Cohen ............... G06F 17/30536
                                                                706/48

(Continued)

OTHER PUBLICATIONS

PCT International Search Report and Written Opinion for International Appln. No. PCT/US15/19795, Applicant Vectra Networks, Inc., forms PCT/ISA/210, 220, and 237, dated Jun. 19, 2015 (7 pages).

(Continued)

*Primary Examiner* — Brandon Hoffman
(74) *Attorney, Agent, or Firm* — Vista IP Law Group, LLP

(57) ABSTRACT

Approaches for detecting network intrusions, such as malware infection, Trojans, worms, or bot net mining activities includes: identifying one or more threat detections in session datasets, the session datasets corresponding to network traffic from a plurality of hosts; determining a layered detection score, the layered detection score corresponding to a certainty score and threat score; determining a layered host score, the layered host score corresponding to a certainty score and threat score; and generating alarm data comprising the layered detection score and the layered host score. In some embodiments, the network traffic may be received passively through a network switch; for example, by "tapping" the switch. Other additional objects, features, and advantages of the invention are described in the detailed description, figures and claims.

30 Claims, 12 Drawing Sheets

(56) References Cited

U.S. PATENT DOCUMENTS

| | | | |
|---|---|---|---|
| 8,418,249 B1* | 4/2013 | Nucci | G06F 21/552 |
| | | | 706/20 |
| 8,555,388 B1 | 10/2013 | Wang et al. | |
| 2008/0028463 A1 | 1/2008 | Dagon et al. | |
| 2013/0198203 A1 | 8/2013 | Bates et al. | |
| 2015/0146549 A1* | 5/2015 | Noriega | H04W 24/10 |
| | | | 370/252 |

OTHER PUBLICATIONS

PCT International Preliminary Report on Patentability for International Appln. No. PCT/US2015/019795, Applicant Vectra Networks, Inc., et al., dated Sep. 22, 2016 (6 pages).

* cited by examiner

SYSTEM AND METHOD FOR DETECTING NETWORK INTRUSIONS USING LAYERED HOST SCORING

RELATED APPLICATION DATA

The present application claims the benefit of U.S. Provisional Application Ser. No. 61/951,102, filed on Mar. 11, 2014, titled "Layered Scoring of Hosts' Confidence of Infection", the content of the aforementioned application is hereby incorporated by reference in its entirety.

BACKGROUND

Past signature and anomaly-based network security detection systems implement static approaches in determining the presence of a network threat or security event, such as a network attack or malware infection. In such systems, signatures are often assigned a static severity metric. For example, such static severity metrics may include predefined levels or alerts, such as Informational (e.g. general network update data), Low (e.g. low-threat), Medium (e.g. moderate-threat), High (e.g. high-threat), and Critical (e.g. severe-threat). When a security event occurs and an alert is raised, the assigned severity value may be reported.

However, the peculiarities and/or finer contextual details of an occurrence generally do not influence the severity level. For example, if a network security detection system detects a possible threat and issues a "Medium" alert, the alert data may lack information and/or context about the event. Conventional intrusion detection systems (IDS) often lack the ability to combine registered security events and assess their synergistic effect. Once reported, events exist in isolation and it is up to a human operator to analyze them and reconstruct a comprehensive view of the attack based on the operator's expert knowledge. The lack of information often forces a human operator (e.g. network administrator, security administrator) to make judgment calls in an informational vacuum; looking to estimate the real security threat and impact to their business caused by the event.

While some conventional detection systems have alert correlation capabilities—such as higher severity alerts superseding ones with lower severity in the same logical (e.g. detection) group—these measures are typically designed to reduce the noise level of the system and do not correct the problems caused by the lack of contextual information.

Additionally, in traditional network threat detection systems reported security events are often static in time. In these systems the sensors detect in "real-time", and as such only detect network threats that are happening at the detection time that register at a significant enough level to be detected.

As is evident, there is a need for improved approaches for determining the seriousness of a collection of network threats.

SUMMARY

Approaches for detecting network intrusions—such as computer contaminant infection, malware infection, Trojans, worms, or botnet mining activities—in some embodiments may comprise: identifying one or more detections in session datasets, the session datasets corresponding to network traffic from a plurality of hosts; determining a layered detection score, the layered detection score corresponding to a certainty score and threat score; determining a layered host score, the layered host score corresponding to a certainty score and threat score; and generating alarm data comprising the layered detection score and the layered host score. In some embodiments, the network traffic may be received passively through a network switch, for example, by "tapping" the network switch. Other additional objects, features, and advantages of the systems and methods are described in the detailed description, figures, and claims.

BRIEF DESCRIPTION OF THE DRAWINGS

The drawings illustrate the design and utility of some embodiments of the present invention. It should be noted that the figures are not drawn to scale and that elements of similar structures or functions are represented by like reference numerals throughout the figures. In order to better appreciate how to obtain the above recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are directed to a method, system, and computer program product for detecting network intrusions. Other objects, features, and advantages of the invention are described in the detailed description, figures, and claims.

Various embodiments of the methods, systems, and articles of manufacture will now be described in detail with reference to the drawings, which are provided as illustrative examples of the invention so as to enable those skilled in the art to practice the invention. Notably, the figures and the examples below are not meant to limit the scope of the present invention. Where certain elements of the present invention can be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, the present invention encompasses present and future known equivalents to the components referred to herein by way of illustration.

Before describing the examples illustratively depicted in the several figures, a general introduction is provided to further understanding.

The disclosed approaches include a scoring system that, in some embodiments, implements a set of dynamic metrics including a certainty score (CS) and a threat score (TS) that correspond to one or more computer contaminants infecting a host. In some embodiments, a computer contaminant is generally an infection of a host machine with malicious or fraudulent software, such as malware, Trojans, worms, or software to carry out unwanted cyber currency mining activity, click fraud, or spamming activity. In some embodiments, the dynamic metrics are applied to the process of scoring individual security events (e.g. detections of security threats/occurrences, malware infections, network attacks) and applied to the process of scoring one or more hosts in a network. In some embodiments, the hosts in the network generate session data that may be analyzed to identify threats and score them as detections. In some embodiments, the scoring of individual security events is implemented in a detection scoring process (DSP) module. In some embodiments, the scoring of the one or more hosts in the network is implemented in a host scoring process (HSP) module. In some embodiments, in concert, the DSP and HSP modules generate layered host scores that integrate past historical detection data and host data to generate alarm data that give network administrators an enhanced or more complete picture of the state of hosts in their network.

Figure 1A:
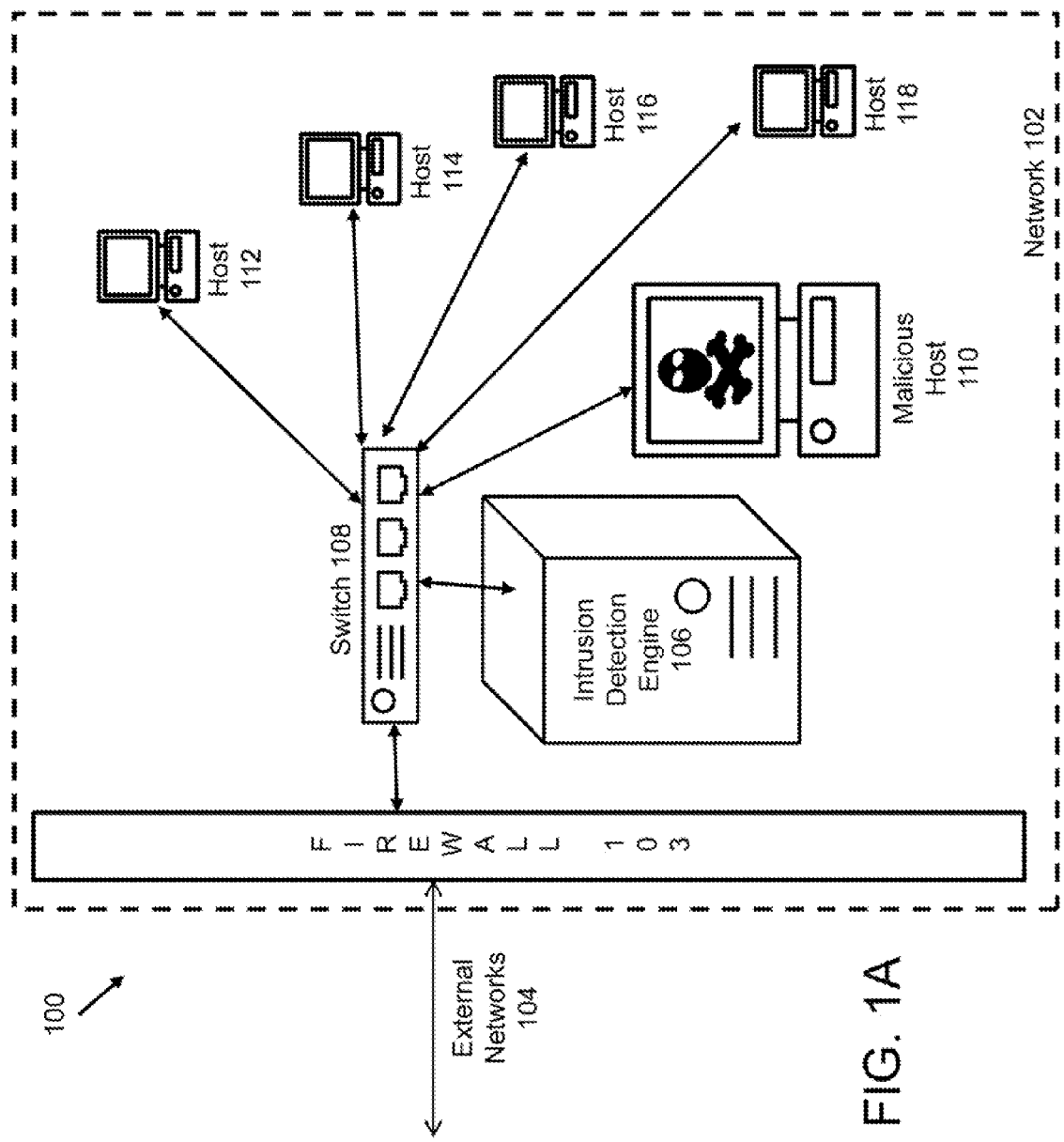
FIG. 1A-B illustrates an example environment in which an intrusion detection system implementing layered host scoring may be implemented, as according to some embodiments.

FIG. 1A illustrates an example environment 100 in which an intrusion detection system 106 may be implemented to detect intrusions by a malicious host 110, as according to some embodiments. There, an example network 102 environment comprises one or more hosts (e.g. assets, clients, computing entities), such as host entities 110, 112, 114, 116, and 118, that may communicate with one another through one or more network devices, such as a network switch 108. The network 102 may communicate with external networks 104 through one or more network border devices as are known in the art, such as a firewall 103.

In some embodiments, the intrusion detection engine 106 enables network traffic to be parsed into session datasets, analyzed, and layered scores to be generated for one or more hosts that are inside the network 102. In some embodiments, as illustrated, the intrusion detection engine 106 may tap (e.g. TAP/SPAN) the network switch 108 to passively analyze the internal network traffic in a way that does not harm or slow down the network (e.g. by creating a copy of the network traffic for analysis). In some embodiments, the intrusion detection engine is an external module that is coupled to the switch 108. While in some embodiments, the intrusion detection engine may be directly integrated into network components, such as a switch 108 or a firewall 103. While still, in some embodiments the intrusion detection engine may be integrated into one or more hosts (e.g. 118) in a distributed fashion (e.g. each host may have its own set instructions, the hosts collectively agree to follow or adhere to the instruction to collect information and report information to one another or a database to collectively work as a intrusion detection engine). Still in some embodiments, the intrusion detection engine may be integrated into a single host (e.g. host 112) that performs intrusion detection engine actions for the network 102.

Figure 1B:
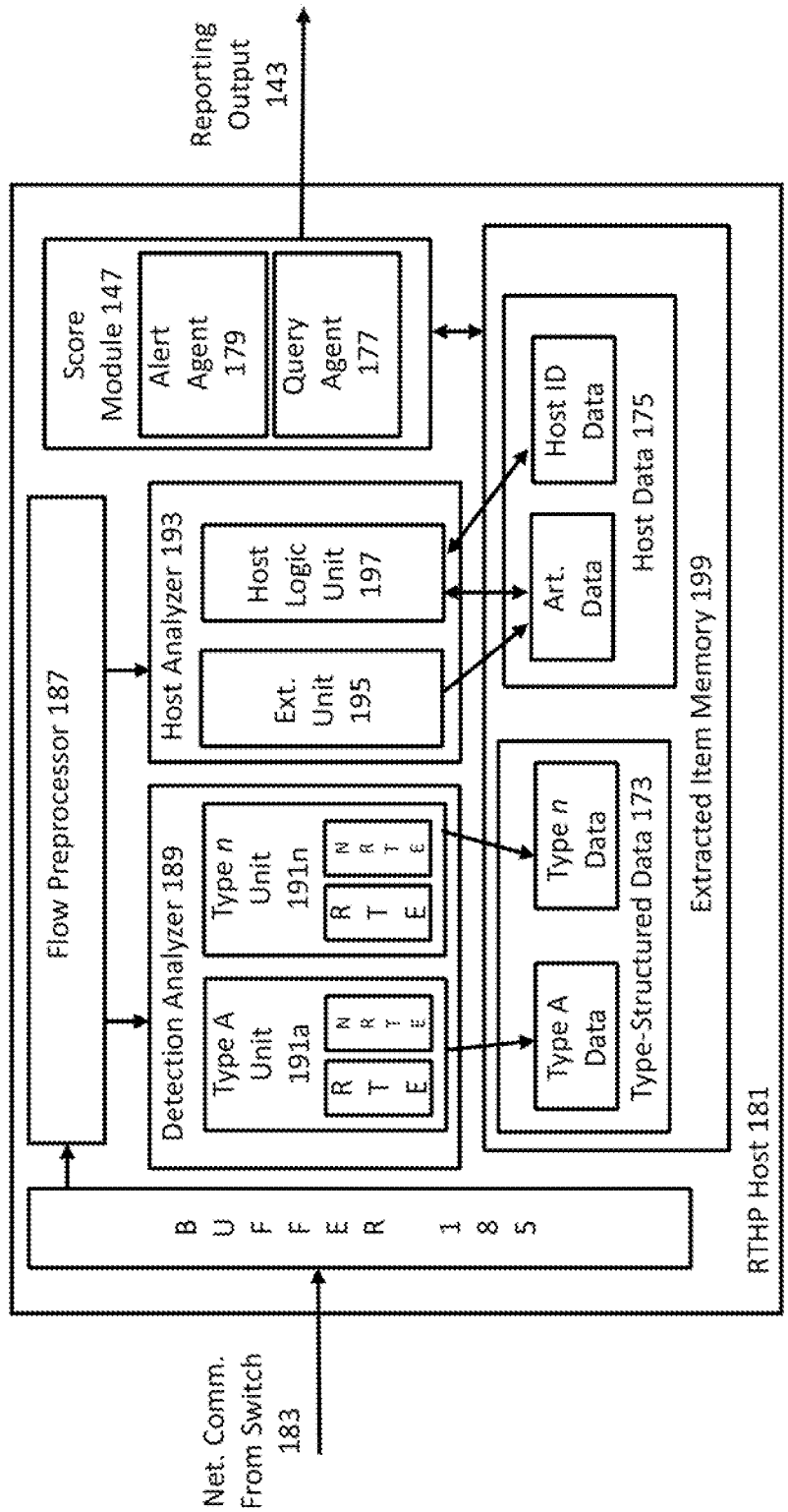

FIG. 1B illustrates an example system in which the approaches disclosed may be implemented. FIG. 1B shows internal aspects of a real-time historical perspective engine (RTHP) 181. At 183, network communications from a switch may be received by RTHP 181 and loaded into a buffer (e.g. rolling buffer) memory structure 185. A flow preprocessor 187 can parse the network traffic using one or more parsing units (not depicted), each of which may be tuned to parse different types of network traffic (e.g. HTTP, TCP). In some embodiments, the flow preprocessor 187 generates session datasets that correspond to communications between two hosts (e.g. between two hosts inside a network or between an external host/entity and an internal host).

The session datasets may be analyzed by a detection analyzer 189, which detects different types of threats or analysis data, and a host analyzer 193, which analyzes the hosts which generated the network traffic. In some embodiments, the detection analyzer 189 and host analyzer 193 may extract one or more data items and store them in an extracted item memory 199.

In particular, the session datasets may be analyzed by a detection analyzer unit 189, which may comprise one or more detection units 191a-191n. In some embodiments, the detection units may contain a real time analysis engine ("RTE") which can identify threats without collecting past data (e.g. accumulating state) and a non-real-time analysis engine ("NRTE"), which generally accumulates data about network events that appear benign, but accumulate to significant threat levels (e.g. DDoS attacks).

In some embodiments, the detection units are customized to analyze the session datasets and extract type-specific data that corresponds to various network threats, attacks, or analysis parameters. For example, detection unit Type A 191A may be designed for detecting relay communication attacks; for every type of relay communication detected, detection unit Type A 191 may store the detection in "Type A" structured data. As a further example, detection unit Type n 191n may be designed to detect bot activity, such that every time a computer or host in the network performs bot-related activities, detection unit Type n may store detection-related data in "Type n" structured data. In some embodiments, the detection data per unit may be stored in a type-structured data 173 portion of memory, which may be partitioned from extracted item memory 199.

In some embodiments, the host analyzer 193 comprises an extraction unit 195 and a host logic unit 197. The extraction unit 195 is designed to extract artifacts or identification data (e.g. MAC address, IP address), which may be used to identify a host, and store the extracted data in an artifact data store ("Art. Data") in host data 175. The host logic unit may analyze the extracted artifact data and generate host ID data (e.g. durable host IDs).

In some embodiments, a score module 147 may be implemented to analyze the extracted item memory 199, score the detections in the type-structured data 173, and correlate the detections with host ID data. In some embodiments, the score module 147 can run checks on the type-structured data to determine if any thresholds have been exceeded. In some embodiments, the score module may edit or update the host ID data (e.g. in host data 175) with new detection information. For instance, the score module may correlate newly detected bit-coin mining activity to an existing host ID and update the host ID with further information regarding the recent bit-coin activity. In some embodiments, the score module 147 further comprises an alert agent 179 which can generate alert data if a network attack threshold is exceeded. In some embodiments, the score module 147 comprises a query agent 177 which can retrieve data from the extracted item memory 199 in response to network security administrators or other network security devices. In some embodiments, the score module may generate the alert data or query responses as reporting output 143.

Further details of an example system are described in U.S. patent application Ser. No. 14/643,931, entitled "A system and method for detecting intrusions through real-time processing of traffic with extensive historical perspective", filed on even date herewith, which is hereby incorporated by reference in its entirety.

Figure 2:
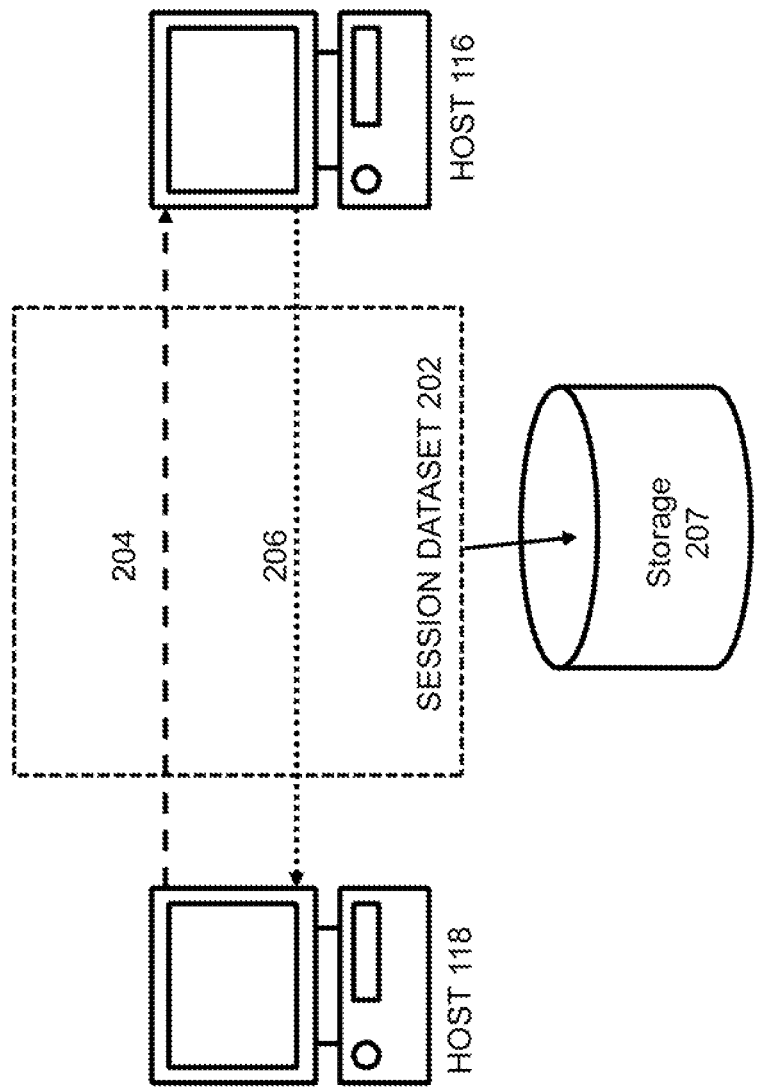
FIG. 2 illustrates example session data sets that correspond to unidirectional flows of information between hosts, as according to some embodiments.

FIG. 2 illustrates a session dataset comprising one or more unidirectional flows between two computing entities, as according to some embodiments. In this example, host 118 is communicating with host 116. First, host 118 generates a first communication flow dataset 204 (e.g. request, unidirectional data flow). Second, host 116 generates a second communication flow dataset 206 (e.g. response, unidirectional data flow). In some embodiments, by examining packet contents (e.g. data/information transmitted in the unidirectional data flows), such as source and destination addresses, the intrusion detection engine 106 may combine matching flows into a session dataset 202. However in some cases, a request (e.g. 204) is sent, but there is no reply (e.g. 206 does not occur). This may be because host 118 addressed its communications to a non-existent target, for example. Nonetheless, this communication may still be categorized a session dataset by the intrusion detection engine 106. After identifying and categorizing one or more flows into a session dataset (e.g. 202), the intrusion detection engine 106 may store the session data, unidirectional flow data, and other data, such as session identifying data, in a storage device 207.

Figure 3:
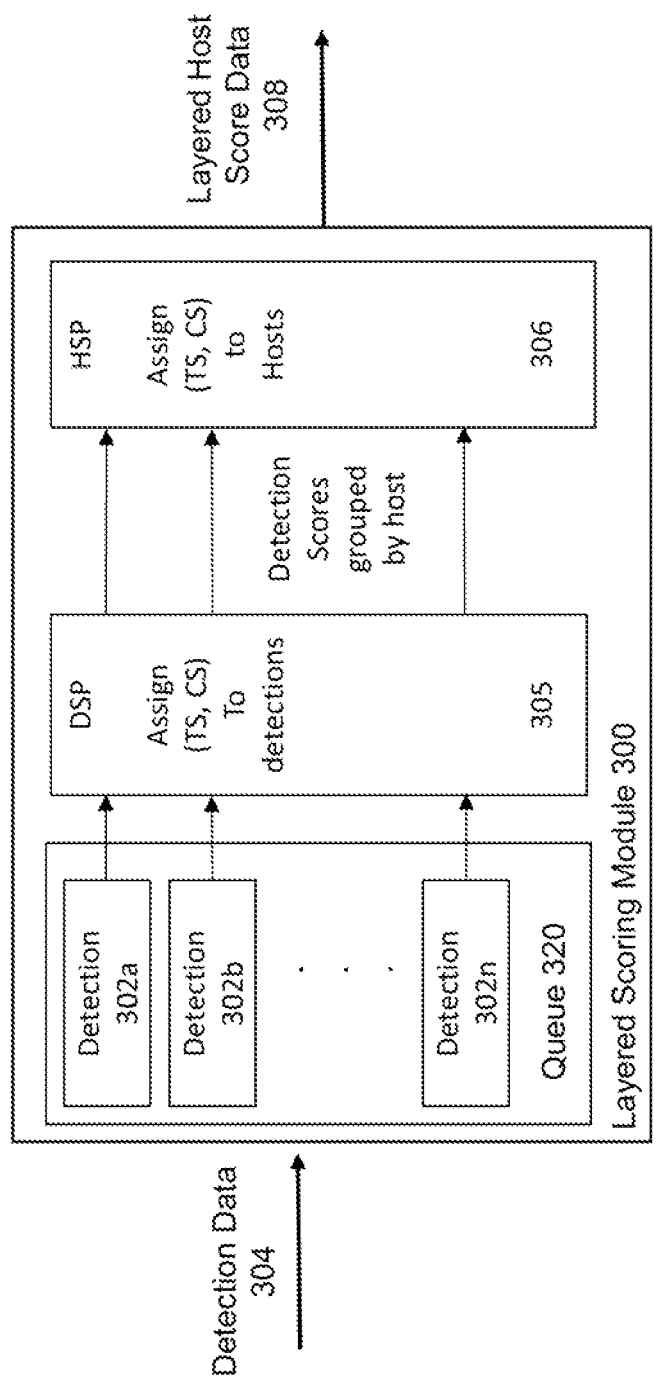
FIG. 3 illustrates internal aspects of a layered host scoring mechanism, as according to some embodiments.

FIG. 3 illustrates internal aspects of a layered host scoring module or mechanism 300, as according to some embodiments. There, potential computer contaminant detections (e.g. "detections" 302*a-n*) may serve as an input and report a threat event or forms of anomalous network behavior. In some embodiments a threat event corresponds to data that describes malicious network behaviors (e.g. a host computer inside network contacting other hosts in the network in rapid succession trying to spread a Trojan). In some embodiments anomalous network behavior or threat behavior may be identified by tracking data including which host contacts which resource (e.g. other hosts, clients, servers, external services) over given periods of time. For example, in this case, when a given host performs network behavior out of its "normal" behavior (e.g. statistically different than past records), the corresponding network behavior may be categorized as anomalous.

Referring to FIG. 3, detection data 304 is received for processing, where the received detection data (e.g. 302*a-n*) may be contained in a detection queue 320 data structure for scoring. In some embodiments, as illustrated, these detections are transferred (e.g. reported) to the detection scoring process module 305 for score analysis and score data generation. In some embodiments, certainty score data corresponds to a measure of the likelihood of something (e.g. a detection of a network attack, malware detection), being true and may correspond to a probability value. In some embodiments, certainty score data may be generated and/or processed both in the detection scoring process module 305 and host scoring process module 306, as described in further detail below. Layered host score data 308 may be provided from the layered scoring module 300.

In some cases, data evidencing intrusions may be inherently dynamic, possibly changing as more network data is observed. Traditional signature "all or nothing"-based approaches may often generate false positives due statically assigning either 100% or 0% infection flags depending on whether traffic matching the signature is observed. The layered host module overcomes these issues and reduces false positives by generating certainty score data. The certainty score can simplify the turbulent intrusion network data in some embodiments by basing certainty on aggregated past detection data. In some embodiments, if multiple detections are made, an increased certainty measure (e.g. probability) may be reflected in the certainty score data. In this way, the layered scoring module 300 can be tuned and/or customized to adapt to dynamic network environments. In some embodiments, the certainty score reflects the probability that a given threat event occurred (for example the probability of spamming behavior occurring, or the probability of data exfiltration occurring), given all the evidence observed so far. In some embodiments, certainty score data may be based at least in part on the degree of difference between the network behavior that caused the detection and normal network behavior. In some embodiments, threshold limits may be implemented to track differences between normal network behavior and the detection data such that when the differences exceed the threshold, certainty score values (e.g. probability, confidence) may be increased proportionally.

In some embodiments, in both the detection scoring process module 305 and the host scoring process module 306, threat score data may correspond to a measure of the potential for harm if the event being scored is true or the host being scored is infected (e.g. if spamming behavior was occurring or if data exfiltration was occurring). In some embodiments, the threat score data corresponds to the seriousness or amount of potential harm from a network intrusion, or attack. In some embodiments, the threat score data may not correspond to an aggregation of evidence like certainty score, but rather in terms of worst-case scenarios (e.g. seriousness). In some embodiments, threat score data corresponds to the aggressiveness of the apparently malicious behavior. In some embodiments, threat score data corresponds to the sophistication of the underlying attack. In some embodiments, threat score data uses embedded expert (e.g. human security professional) information. For instance, a human security professional may assign a given type of seemingly low-risk network behavior a high threat score data value based on the human's past professional security expertise and knowledge. In some embodiments, threat score data uses machine learning information. For instance, a machine learning scheme or entity may assign a given type of seemingly low-risk network behavior a high threat score data value based on the past analyzed and learned detection data. In some embodiments, individual measures of threat score values may still be dynamic as they are based on the current network behaviors to determine the aggressiveness of potential attackers.

Much like a human analyst who tries to look at a network attack in its entirety (e.g. by examining/logging all potential significant network events, or states), the layered scoring module 300 may automate the analysis process and evaluate an attack or infection in association with a network entity from which the attack originated (e.g. attacking host). In some embodiments, different combinations of detection types can contribute to a host's score. In some embodiments, a host score may be similar to a detection score—both may include a threat score and certainty score—however the host score is attributed to a network host. With respect to a host, a certainty score represents the probability of the host being infected with malicious software or being controlled by a malicious entity; whereas, with respect to the host, the threat score represents that malicious software's or malicious entity's potential to harm the network. For instance, if an infected host is mining cyber currency, its threat level may be low; whereas, if an infected host is attacking servers inside an organization's network, its threat level may be high. In some embodiments, these scores are generated based at least in part on the detection scores of detections observed for the corresponding host. In some embodiments, a host score at a given time may be generated by first generating the certainty score and threat score, and combining the scores across time. In some embodiments, if either score surpasses a threshold limit, alarm (e.g. reporting) data may be generated. In some embodiments, the scores are combined (e.g. values added) and combined across time, such that if a threshold limit is surpassed alarm (e.g. reporting) data may generated. The threshold limit may be set per network implementation. For instance, in a low-risk network the threshold limit across time may be set high such that significant amounts of detections may have to occur before a given host is reported. Similarly, in high-risk network the threshold limit can be set low, such that any detection type for any host may surpass the threshold and trigger an alarm and/or reporting data.

Figure 4A:
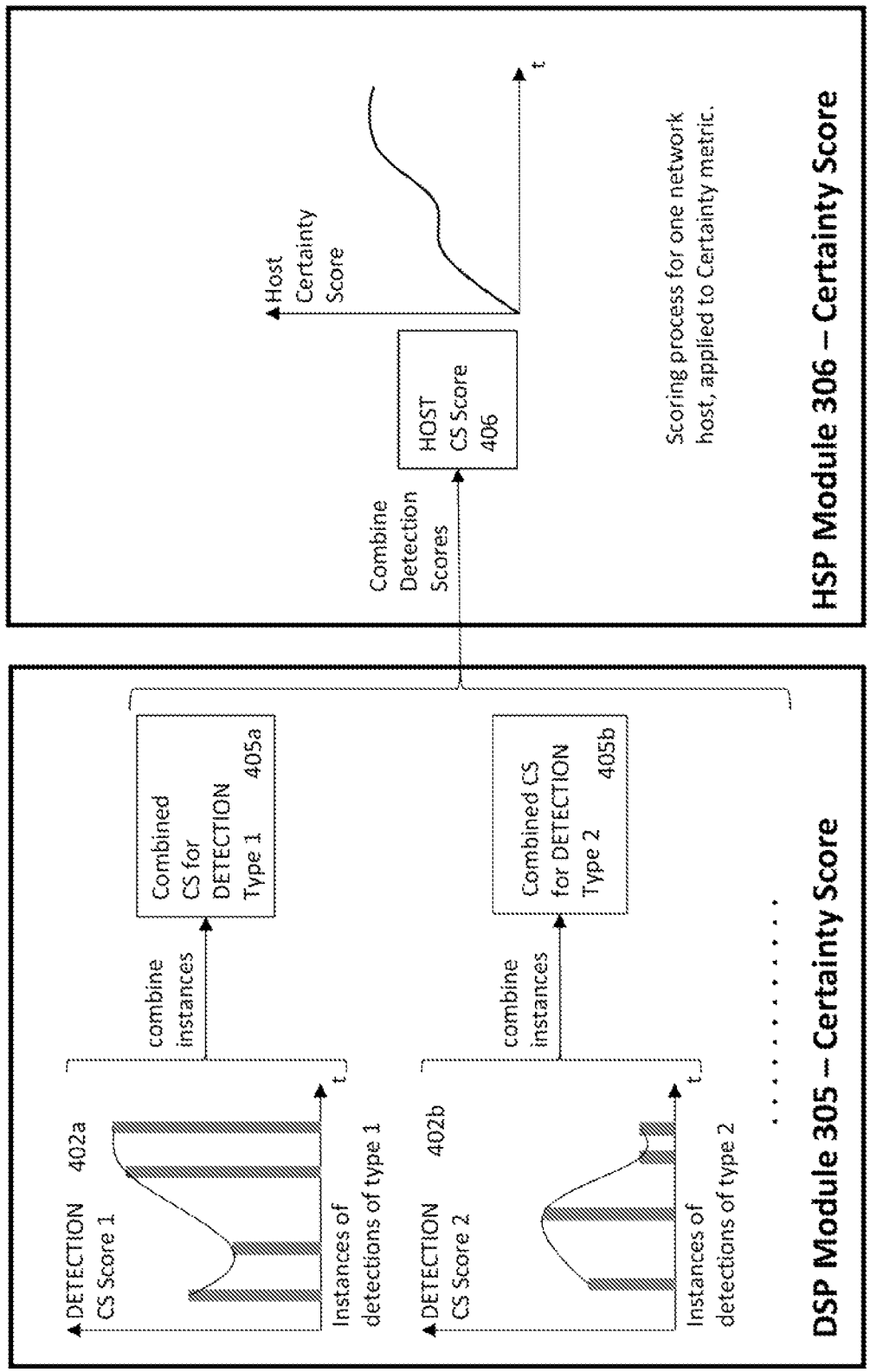
FIG. 4A illustrates aspects of combining detection scores for session datasets across time to generate certainty score data for hosts, as according to some embodiments.

FIG. 4A illustrates aspects of processing detection certainty scores created as a result of analyzing session datasets across time to generate certainty score data for hosts, as according to some embodiments. In some embodiments, detection certainty score data may be generated for a first type of detection 402a (e.g. computer contaminant infection) and a second type of detection 402b (e.g. computer contaminant infection). The types of detections or computer contaminants may be of different types. For example, detection certainty score data for the first type (e.g. 402a) may correspond to cyber currency mining and detection certainty score data for the second type (e.g. 402b) may correspond to a brute forcing behavior inside the network. In some embodiments, the combined instances of the detections are combined respectively (e.g. by type) to generate combined certainty score for detection Type 1 405a and combined certainty score for detection Type 2 405b. In some embodiments where certainty score data is combined or is an aggregation of past intrusions (e.g. past detection evidence), the scores may be aggregated (e.g. several small scores compiled to a higher score) in different ways. In some embodiments, the time at which the detections occurred may be taken into account by evaluating several possible time windows in which a hypothetical attack might have begun based on previously observed detections. For example, three uncertain detections (e.g. certainty score data=25% confidence) the last of which occurred recently (e.g. within the past hour) may have a larger effect on the host certainty score than a very certain detection (e.g. certainty score data=60%) that occurred a long time in the past (e.g. one month ago).

The combined detection scores for each detection type may be passed from the detection score process module 305 to the host score process module 306 to generate combined detection data or cumulative (e.g. multi-type) host certainty score data 406, which corresponds to detections (e.g. detections corresponding to computer contaminations) of different types for a host.

Figure 4B:
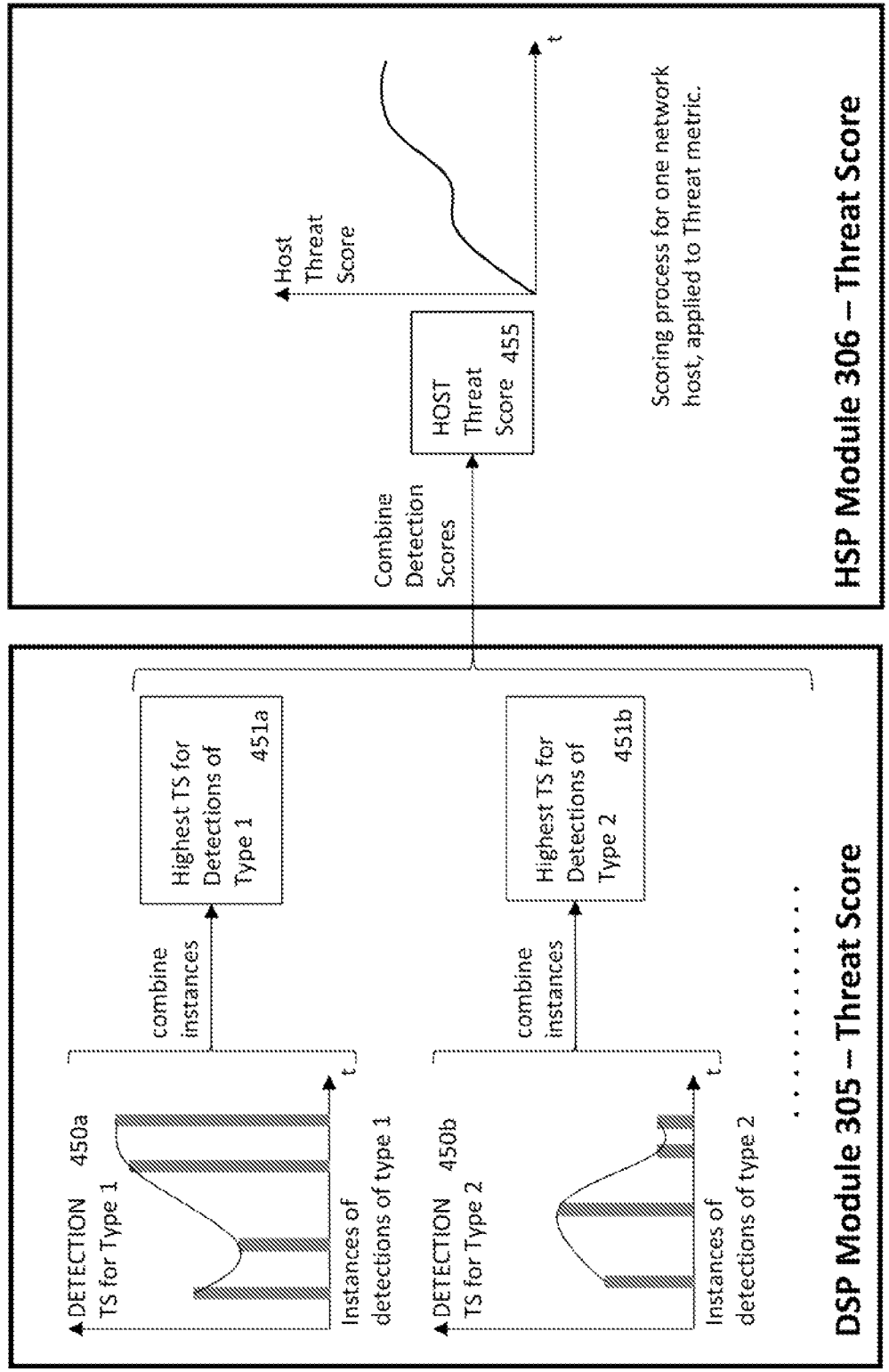
FIG. 4B illustrates aspects of combining detection scores for session datasets across time to generate threat score data for hosts, as according to some embodiments.

FIG. 4B illustrates aspects of processing threat scores for detections and hosts, as according to some embodiments. In some embodiments the threat score data may be a measure of potential threat (e.g. amount/nature of potential network harm). In some embodiments, detection threat score data may be generated for a first type 450a of detection or network intrusions and a second type 450b of detection or network intrusion. In some embodiments, the threat score data per type may be combined to generate combined threat score per type. In some embodiments the threat score may be added together to represent a worst-case scenario, while in some embodiments only the highest threat score may be used as a representation of a worst-case scenario. The combined detection scores may be passed from the detection score process module 305 to the host score process module 306 to generate a cumulative (e.g. multi-type) host threat score data value 455.

In some embodiments, the threat score data (e.g. 450a, 450b, and/or 451a, 451b) corresponds to decaying (e.g. decreasing) score based on how far in the past the detection was last observed. In some embodiments, threat score data values may decay (e.g. decrease) at different rates for each detection type, as some threats cease to be threatening as soon as a threat ceases to be detected, whereas others are threats as long as a host is on the network. In this way, a selected temporal decay of the threats (as reflected in the host threat score) is different from traditional security systems in which all threats are merely given a severity score and time stamp, (relying on the company's security operations staff to be experts in estimating how long a particular threat should remain interesting).

Unlike conventional security systems, in which each type of detection is considered in isolation and a human expert must know which combinations are most threatening, the intrusion detection system with layered host scoring treats different combinations of detection types as more threatening than others.

In some embodiments, when detections of different types are combined, several outcomes may result. In one result, some detection types may supersede others and such detections are merged into one. In one result, some detection types are relevant to each other and when they happen together they have a synergistic effect on the host certainty score and threat score. For example, detection of a command and control channel and monetization behavior such as sending spam emails, raise the likelihood of the host being infected with botnet malware. In one result, some detection types may be completely irrelevant and when these happen together the effect is negative—the certainty that the host is infected becomes lower; in other words it raises the likelihood of a false positive (FP). For example if a host exhibits an Advanced Persistent Threat (APT) behavior but at the same time it is not behaving in a stealthy manner like a true APT would, this increases the likelihood of an FP and thus may reduce the host's threat and certainty scores.

Figure 5A:
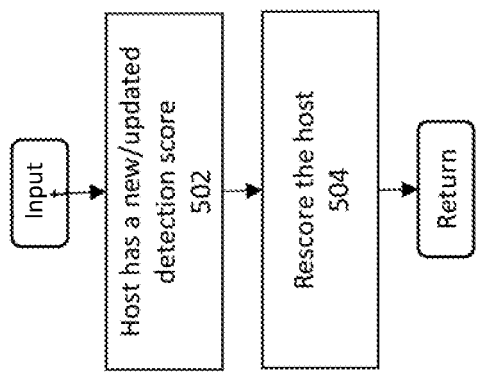
FIG. 5A shows a flowchart for an approach for scoring hosts, as according to some embodiments.

FIG. 5A shows a flowchart for an approach for scoring hosts, as according to some embodiments. In the system, detections may be associated with a host to which the detection is attributed. In some embodiments, the process starts with a new detection being created and/or an existing detection receiving updated properties, such as its threat score, certainty score, the last time the detection was seen, or the detection's activity status. In some embodiments, the system supports the capability for a detection to be marked inactive, in which case the detection's score will no longer contribute to the score of the host to which the detection is attributed. At 502, the host scoring process module 306 may receive a detection update that leads it (e.g. triggers) to recalculate the affected host's threat score and certainty score. At 504, the host may be recorded to reflect the updated data. Host rescoring logic is described in greater detail with reference to FIG. 5B.

Figure 5B:
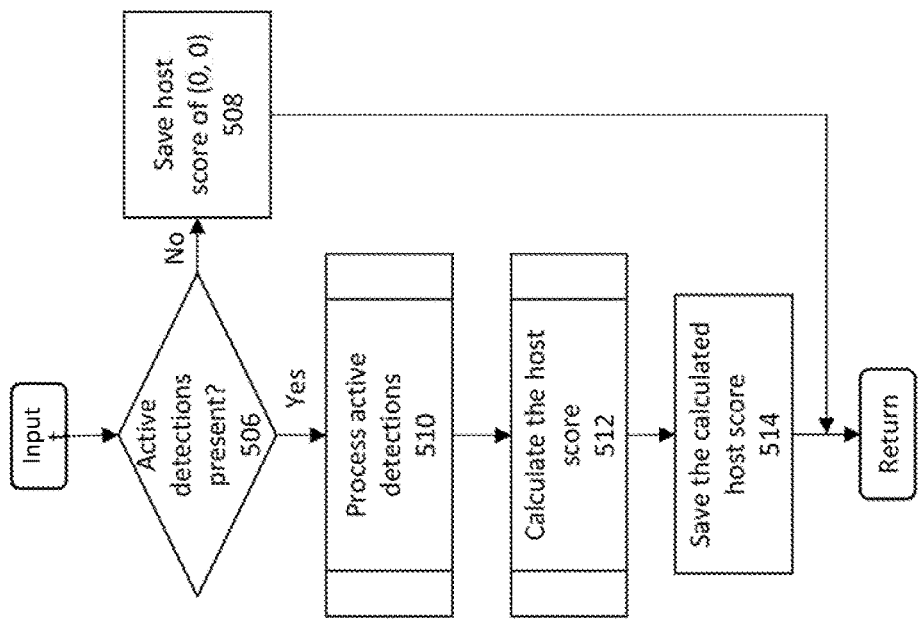
FIG. 5B shows a flowchart for an approach for scoring hosts, as according to some embodiments.

FIG. 5B shows a flowchart for an approach for scoring hosts. In some embodiments, when a host's scores are to be recalculated, a determination is made regarding whether or not the host has corresponding active detections at 506. If the host does not have corresponding active detections, the host's threat score and certainty score may both be set to zero and saved into the database at 508. If, on the other hand, the host does in fact have corresponding active detections, the host scoring process module may process the active detections for the host at 510. Once the active detections are processed using approaches discussed above, the host score may be calculated at 512, after which the newly generated data at 512 may be stored or otherwise saved in the database 514.

Figure 5C:
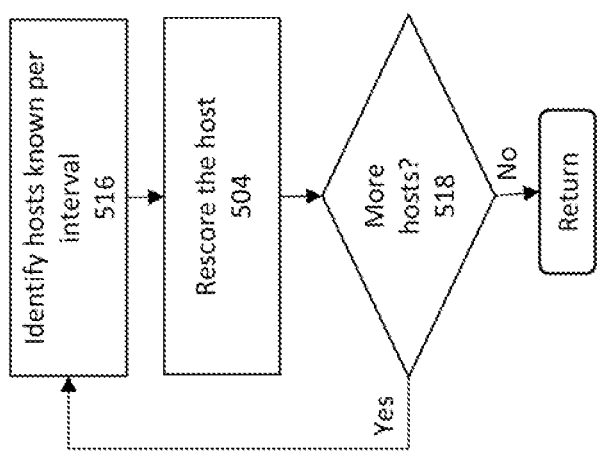
FIG. 5C shows a flowchart for an approach for scoring hosts, as according to some embodiments.

FIG. 5C shows a flowchart for an approach for rescoring hosts. In some embodiments, the system may perform periodic recalculation of host scores. At 516, new hosts (e.g. new since a last time interval) may be identified. At 504, the new hosts are rescored. In some embodiments at 504, the previously known host scores are generated anew (e.g. regenerated) and the newly identified hosts' scores are generated using the above approaches. In this way, the host data generation process may be repeated iteratively for every known host 516 on a periodic time interval (e.g. every hour, day, 20 minutes) to ensure up-to-date host scores. In some embodiments, the periodic rescoring (e.g. 504) is performed to ensure the host's scores are updated which may take into account that currently active detections move further and further into the past as part of a sliding window operation. This processing continues 518 until all the hosts known by the system have been processed.

Figure 6:
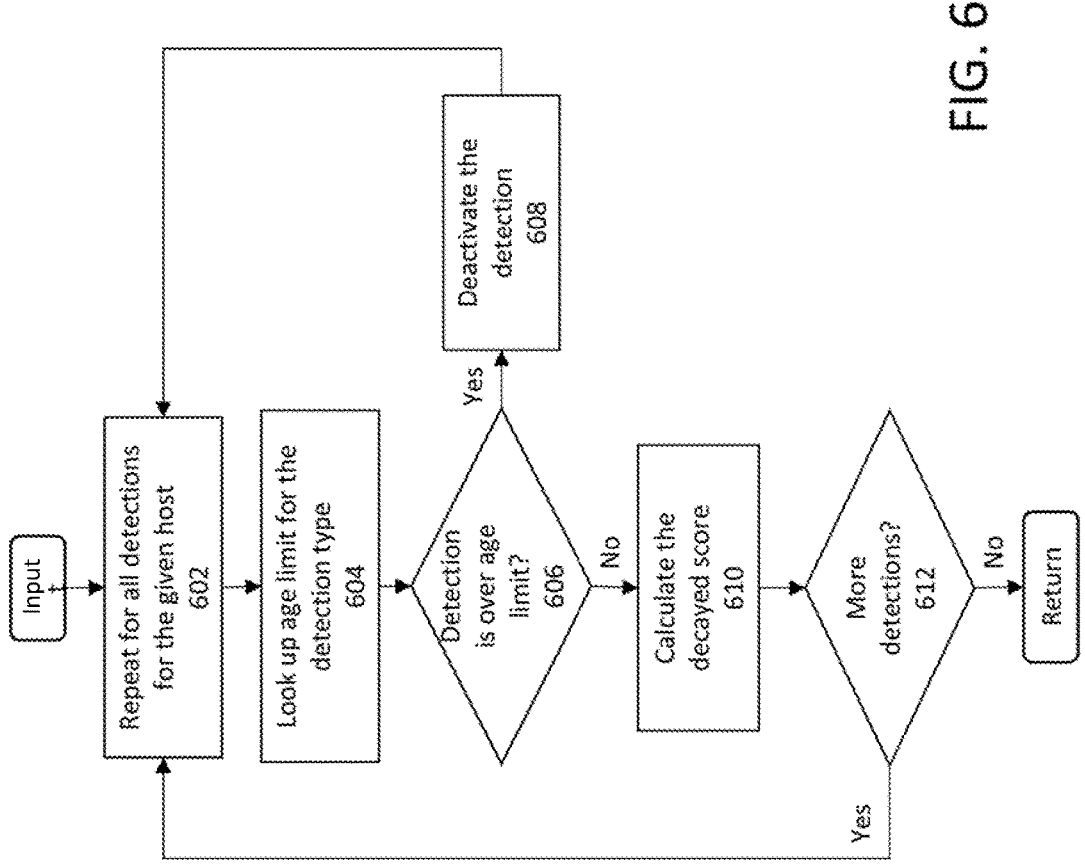
FIG. 6 shows a flowchart for an approach for scoring hosts using age limits, as according to some embodiments.

FIG. 6 shows a flowchart for an approach for scoring hosts using age limits or expiration limits, as according to some embodiments. There, when a specific host is supplied as a parameter, the process may iterate over active detections associated with this host at 602. In some embodiments, a detection instance belongs to a certain type (e.g. email spam, or port scanning) and the detection type has a specific age limit defined by experts (e.g. human experts, machine learning). The system looks up the age limit and compares it to the detection's last seen timestamp at 604.

If the detection is older than the age limit 606, it may be permanently deactivated at 608. In some embodiments, the detection data that is older than the age limit has its state updated to "inactive" in the database. In some embodiments, a deactivated detection is not considered for further calculation and the process iterates to the next detection. In some embodiments, at 610, if the detection is within its type's age limit, the system calculates the decayed score 610. As applied to threat scores data for example, the decay score may be calculated using a decay rate that decreases a threat score value as the amount of time (since the last corresponding detection) increases. In some embodiments the decay rate can be adjusted per type of network intrusion detected. At 612, the system may iterate over remaining detections. The result is a set of decayed detection scores for a single host.

Figure 7:
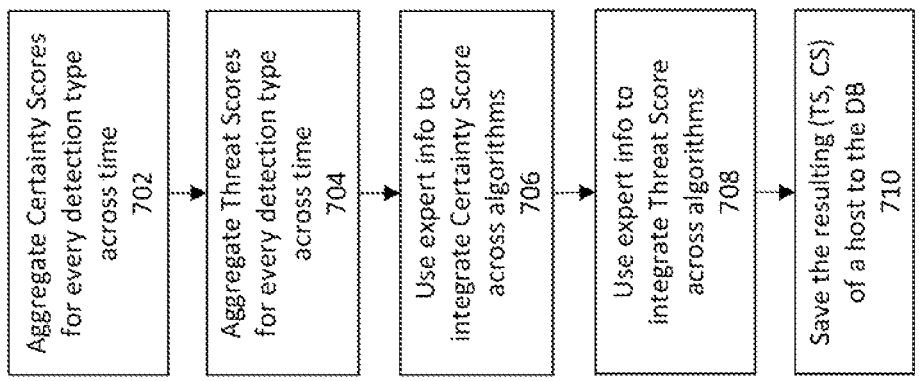
FIG. 7 shows a flowchart for an approach for scoring hosts using aggregation, as according to some embodiments.

FIG. 7 shows a flowchart for an approach for scoring hosts using aggregation, as according to some embodiments. There, certainty score data for a given algorithm may be integrated across time 702 by treating them as probabilities of detection type behavior given some unobserved data and some prior assumption about how often that behavior is likely to occur in some time window T. In some embodiments, this process analytically corresponds to adding a constant based on the logarithm of the certainty for each detection in time window T, as well as subtracting a constant based on the size of the time window T, and finally taking the result and putting it through a logistic sigma function (thus converting certainty back onto a normalized probability). In some embodiments, dependency on the time window T can be reduced or removed by repeating the process for many different values of T and the results accumulated in some way (for example taking the maximum certainty, an average certainty, or a certainty weighted average of certainty).

In some embodiments, at 704 threat score data for a given algorithm may be integrated across time by allowing individual threat score data to decay (e.g. be reduced in value) with time, and then taking the maximum of the decayed threat scores. This corresponds to the intuition that threat represents the potential for harm, and therefore should roughly track worst-case scenarios (hence take the maximum threat score).

In some embodiments, at 706 the certainty score data from the different detection types may be aggregated using expert information. The expert information may be expressed by an n×n matrix, where n is the number of possible detection types. Each element (e.g. number, value) in the matrix represents how much the certainty from the detections corresponding to the row and column respectively interact to increase the overall certainty. This matrix may be used to assign the 2nd order coefficients in an n dimensional paraboloid that maps the n different detection certainty scores to a number that is put through logistic sigma function for normalization. The paraboloid allows specific pairs of uncertainties to be integrated differently based on expert knowledge of that pair of detection types.

In some embodiments, similar to the certainty score operation at 706, the threat score data from the different detection types may be aggregated using expert information at 708. This expert information is expressed by an n×n matrix, where n is the number of possible detection types. Each element (e.g. number, value) in the matrix represents how much the threat (e.g. amount of potential harm) from the detections corresponding to the row and column respectively interact to increase the overall threat. This matrix may be used to assign the 2nd order coefficients in an n dimensional paraboloid that maps the n different detection threat scores to a number that is put through logistic sigma function for normalization, resulting in the final host threat score. This allows specific pairs of threats to be integrated differently based on expert knowledge of that pair of detection types.

At 710, in some embodiments, the resulting certainty score data and threat score data may be written (e.g. stored) in a database for future presentation in user interfaces for a company's information security staff or future use in machine based detection scheme. In some embodiments, the threat score data and certainty score may further be combined generate a single aggregated score, that may correspond to, in some embodiments, the likelihood of host infection and worst case scenario. At 710, in some embodiments, the resulting aggregated score may be written (e.g.

stored) in a database for future presentation in user interfaces for a company's information security staff or stored for future use in a machine based detection scheme.

System Architecture Overview

Figure 8:
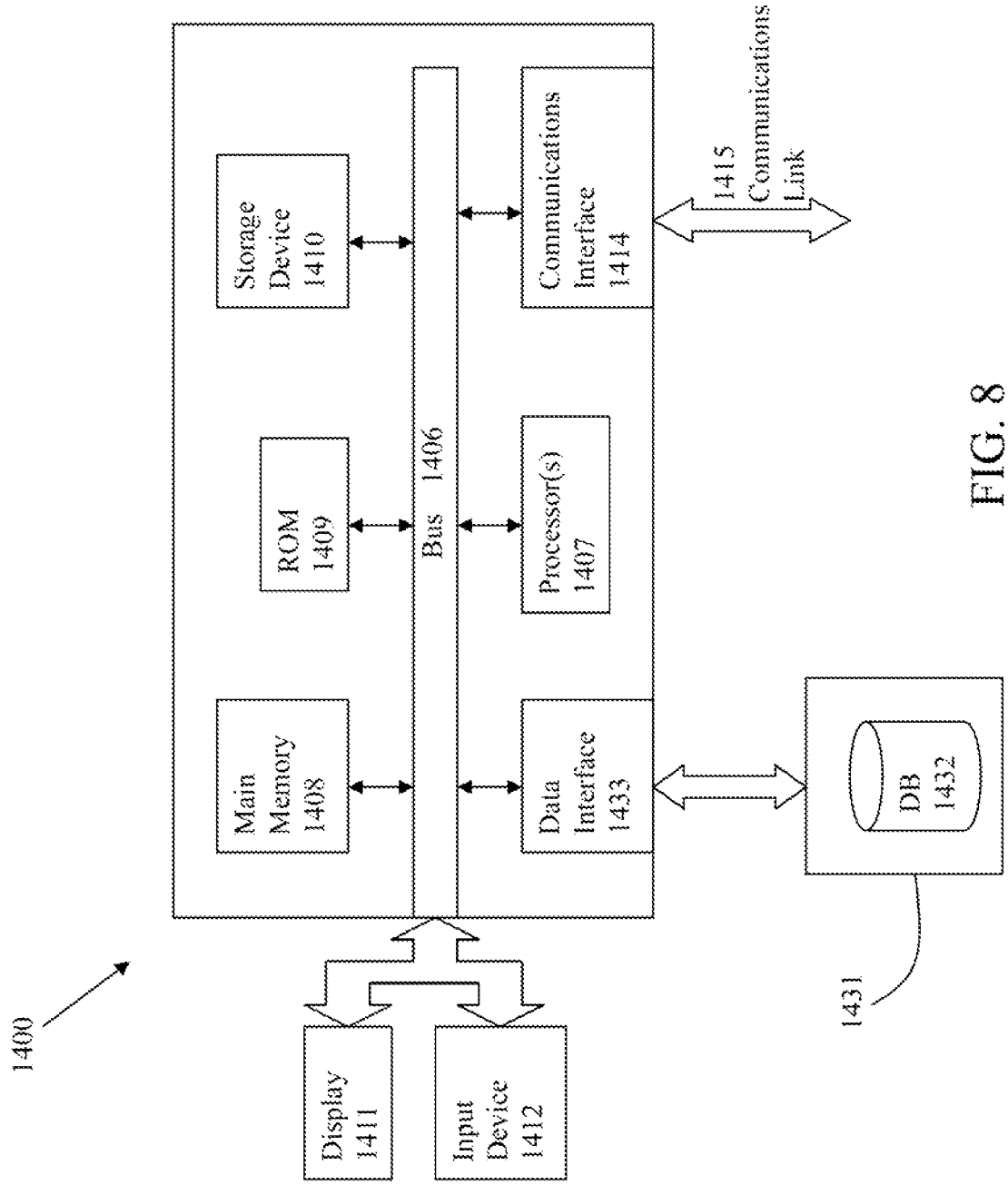
FIG. 8 illustrates example system architecture on which some embodiments may be implemented.

FIG. 8 is a block diagram of an illustrative computing system 1400 suitable for implementing an embodiment of the present invention for performing intrusion detection. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control. A database 1432 may be accessed in a storage medium using a data interface 1433.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method for generating layered host scores, comprising:
   identifying one or more computer contaminate detections by analyzing one or more session datasets, the session datasets corresponding to network traffic from a plurality of hosts;
   generating host certainty score data that corresponds to a confidence that a host is compromised by one or more computer contaminants;
   generating host threat score data that corresponds to a potential harm from the one or more computer contaminants compromising the host; and
   storing the host certainty score data and the host threat score data as a layered detection score in a database, wherein the layered detection score is generated by comprising:
      combining a first detection certainty score data for a first detection type and a second detection certainty score data for a second detection type into a combined host certainty score;
      combining a first detection threat score for the first detection type and a second detection threat score for the second detection type into a combined host threat score; and
      combining the combined host certainty score with the combined host threat score.

2. The method of claim 1, further comprising:
   generating detection certainty score data that corresponds to a confidence that one or more computer contaminant detections are valid.

3. The method of claim 2, wherein the host certainty score data is generated based at least in part on the detection certainty score data.

4. The method of claim 2, wherein detection certainty score data older than an expiration limit is expired.

5. The method of claim 1, further comprising:
   generating detection threat score data that corresponds to a potential harm from the one or more computer contaminants.

6. The method of claim 5, wherein the host threat score data is generated based at least in part on the detection threat score data.

7. The method of claim 1, wherein the network traffic is received passively through a network switch.

8. The method of claim 1, wherein detection certainty score data comprises of combining individual instances of detections for contaminants of a same type.

9. The method of claim 1, wherein detection threat score data comprises of combining individual instances of detections for contaminants of a same type.

10. The method of claim 1, wherein the layered detection score is generated based at least in part on analyzing an effect of the host threat score data and host certainty over time.

11. system for generating layered host scores, comprising:
    a computer processor to execute a set of program code instructions;
    a memory to hold the program code instructions, in which the program code instructions comprises program code to: identify one or more computer contaminate detections by analyzing one or more session datasets, the session datasets corresponding to network traffic from a plurality of hosts; generate host certainty score data that corresponds to a confidence that a host is compromised by one or more computer contaminants; generate host threat score data that corresponds to a potential harm from the one or more computer contaminants compromising the host; and store the host certainty score data and the host threat score data as a layered detection score in a database, wherein the layered detection score is generated by comprising:
    combining a first detection certainty score data for a first detection type and a second detection certainty score data for a second detection type into a combined host certainty score;
    combining a first detection threat score for the first detection type and a second detection threat score for the second detection type into a combined host threat score; and
    combining the combined host certainty score with the combined host threat score.

12. The system of claim 11, in which the program code instructions further comprises program code to generate detection certainty score data that corresponds to a confidence that one or more computer contaminant detections are valid.

13. The system of claim 12, wherein the host certainty score data is generated based at least in part on the detection certainty score data.

14. The system of claim 12, wherein detection certainty score data older than an expiration limit is expired.

15. The system of claim 11, in which the program code instructions further comprises program code to generate detection threat score data that corresponds to a potential harm from the one or more computer contaminants.

16. The system of claim 15, wherein the host threat score data is generated based at least in part on the detection threat score data.

17. The system of claim 11, wherein the network traffic is received passively through a network switch.

18. The method of claim 11, wherein detection certainty score data comprises of combining individual instances of detections for contaminants of a same type.

19. The method of claim 11, wherein detection threat score data comprises of combining individual instances of detections for contaminants of a same type.

20. The method of claim 11, wherein the layered detection score is generated based at least in part on analyzing an effect of the host threat score data and host certainty over time.

21. A computer program product embodied on a non-transitory computer readable medium, the non-transitory computer readable medium having stored thereon a sequence of instructions which, when executed by a processor causes the processor to execute a method for generating layered host scores, the method comprising:
    identifying one or more computer contaminate detections by analyzing one or more session datasets, the session datasets corresponding to network traffic from a plurality of hosts;
    generating host certainty score data that corresponds to a confidence that a host is compromised by one or more computer contaminants;
    generating host threat score data that corresponds to a potential harm from the one or more computer contaminants compromising the host; and
    storing the host certainty score data and the host threat score data as a layered detection score in a database, wherein the layered detection score is generated by comprising:
        combining a first detection certainty score data for a first detection type and a second detection certainty score data for a second detection type into a combined host certainty score;
        combining a first detection threat score for the first detection type and a second detection threat score for the second detection type into a combined host threat score; and
        combining the combined host certainty score with the combined host threat score.

22. The computer program product of claim 21, wherein the non-transitory computer readable medium further comprises instructions which, when executed by the processor, causes the processor to execute the method further comprising: generating detection certainty score data that corresponds to a confidence that one or more computer contaminant detections are valid.

23. The computer program product of claim 22, wherein the host certainty score data is generated based at least in part on the detection certainty score data.

24. The computer program product of claim 22, wherein detection certainty score data older than an expiration limit is expired.

25. The computer program product of claim 21, wherein the non-transitory computer readable medium further comprises instructions which, when executed by the processor, causes the processor to execute the method further comprising: generating detection threat score data that corresponds to a potential harm from the one or more computer contaminants.

26. The computer program product of claim 25, wherein the host threat score data is generated based at least in part on the detection threat score data.

27. The computer program product of claim 21, wherein the network traffic is received passively through a network switch.

28. The method of claim 21, wherein detection certainty score data comprises of combining individual instances of detections for contaminants of a same type.

29. The method of claim 21, wherein detection threat score data comprises of combining individual instances of detections for contaminants of a same type.

30. The method of claim 21, wherein the layered detection score is generated based at least in part on analyzing an effect of the host threat score data and host certainty over time.

* * * * *